(12) United States Patent
Nordbruch

(10) Patent No.: US 10,399,542 B2
(45) Date of Patent: Sep. 3, 2019

(54) METHOD AND DEVICE FOR OPERATING A VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 15/518,290

(22) PCT Filed: Sep. 29, 2015

(86) PCT No.: PCT/EP2015/072347
§ 371 (c)(1),
(2) Date: Apr. 11, 2017

(87) PCT Pub. No.: WO2016/066357
PCT Pub. Date: May 6, 2016

(65) Prior Publication Data
US 2017/0305389 A1      Oct. 26, 2017

(30) Foreign Application Priority Data

Oct. 27, 2014   (DE) .................. 10 2014 221 772

(51) Int. Cl.
*B60R 25/24*   (2013.01)
*B60R 25/00*   (2013.01)
*B60R 25/30*   (2013.01)

(52) U.S. Cl.
CPC ............ *B60R 25/241* (2013.01); *B60R 25/00* (2013.01); *B60R 25/30* (2013.01); *B60R 2325/10* (2013.01)

(58) Field of Classification Search
CPC ....... B60R 25/241; B60R 25/00; B60R 25/30; B60R 2325/10
See application file for complete search history.

(56) References Cited

U.S. PATENT DOCUMENTS

| 5,276,728 | A |   | 1/1994  | Pagliaroli et al. |
|-----------|---|---|---------|-------------------|
| 6,091,340 | A |   | 7/2000  | Lee et al. |
| 7,148,790 | B2| * | 12/2006 | Aoyama ............ B60R 11/0264 340/425.5 |
| 8,519,836 | B2| * | 8/2013  | Grossman ............... B60R 25/04 340/426.1 |
| 9,399,445 | B2| * | 7/2016  | Abou Mahmoud ........................ B60R 25/2018 |

(Continued)

FOREIGN PATENT DOCUMENTS

| CA | 2778543 A1 | 12/2012 |
|----|------------|---------|
| CN | 101656018 A | 2/2010 |

(Continued)

OTHER PUBLICATIONS

International Search Report dated Jan. 18, 2016 of the corresponding International Application PCT/EP2015/072347 filed Sep. 29, 2015.

*Primary Examiner* — Faye M Fleming
(74) *Attorney, Agent, or Firm* — Norton Rose Fulbright US LLP; Gerard Messina

(57) ABSTRACT

A vehicle-internal security device is configured to perform a method, for example, by executing a computer program, in which method, when access takes place to a vehicle component or a to plurality of vehicle components from outside the vehicle, the vehicle-internal security device restricts or interrupts the access if a corresponding request was received by the vehicle via a communications network.

11 Claims, 1 Drawing Sheet

(56) References Cited

U.S. PATENT DOCUMENTS

| | | | | |
|---|---|---|---|---|
| 2006/0290470 A1* | 12/2006 | Massoll | ................ | B60R 25/24 |
| | | | | 340/5.74 |
| 2007/0100514 A1* | 5/2007 | Park | ...................... | B60R 25/00 |
| | | | | 701/2 |
| 2018/0050700 A1* | 2/2018 | Kingsbury | ........ | B60W 50/0098 |
| 2018/0257605 A1* | 9/2018 | Oberbeckmann | ....... | H04W 4/80 |

FOREIGN PATENT DOCUMENTS

| | | |
|---|---|---|
| CN | 103465906 A | 12/2013 |
| CN | 103810898 A | 5/2014 |
| DE | 102011104061 A1 | 12/2012 |
| DE | 102012222562 A1 | 6/2014 |
| EP | 074552 A1 | 12/1996 |
| WO | 2014146196 A1 | 9/2014 |

\* cited by examiner

METHOD AND DEVICE FOR OPERATING A VEHICLE

CROSS-REFERENCE TO RELATED APPLICATIONS

The present application is the national stage of International Pat. App. No. PCT/EP2015/072347 filed Sep. 29, 2015, and claims priority under 35 U.S.C. § 119 to DE 10 2014 221 772.5, filed in the Federal Republic of Germany on Oct. 27, 2014, the content of each of which is incorporated herein by reference in its entirety.

FIELD OF THE INVENTION

The present invention relates to a method and to a device for operating a vehicle, to the vehicle, and to a computer program for implementing the method.

BACKGROUND

In fully automated (autonomous) parking, which is also referred to as valet parking, a driver parks the driver's vehicle at a drop-off point, e.g., in front of a parking garage, and from there the vehicle drives on its own to a parking position/parking bay and back again to the drop-off point.

In most instances, a parking-lot administration system needs a vehicle remote-control system for this operation, by which the vehicle is able to be started up/remotely controlled via WLAN, for example. For the parking operation, such an access has to be transmitted to a parking-lot management system or to a parking-lot administration system.

SUMMARY

Embodiments of the present invention are directed to preventing misuse of such an access, in particular.

Therefore, an objective on which the present invention is based can be described as providing a method for operating a vehicle that makes it possible to prevent misuse when access to a vehicle component or to a plurality of vehicle components takes place from outside the vehicle. An objective on which the present invention is based can also be described as providing a corresponding device for operating a vehicle. Moreover, an objective on which the present invention is based can be described as providing a corresponding vehicle. An objective on which the present invention is based can furthermore be described as providing a corresponding computer program.

According to one aspect, a method for operating a vehicle includes, when access to a vehicle component or to a plurality of vehicle components takes place from outside the vehicle, a vehicle-internal security device restricting or interrupting the access if the vehicle has received a corresponding request via a communications network.

According to another aspect, a device for operating a vehicle includes a communications interface designed to receive a request for restricting or interrupting access to a vehicle component or to a plurality of vehicle components via a communications network; and a security device, which, in case the vehicle component or the plurality of vehicle components is/are accessed and the corresponding request is received, restricts or interrupts the access to the vehicle component or to the plurality of vehicle components in accordance with the request.

According to a still further aspect, a vehicle is provided, which is designed to execute the described method.

According to yet another aspect, a computer program is provided, which includes program code for executing the described method when the computer program is executed on a computer.

Thus, example embodiments of the present invention are directed to giving a driver the possibility of restricting or interrupting a vehicle-external access to a vehicle component or to a plurality of vehicle components. In particular, this can be accomplished in that the driver transmits a corresponding request for a restriction or an interruption of the access to the driver's vehicle via the communications network. In response to the receipt of the request, the security device then restricts the access or even interrupts the access. In other words, an efficient concept that prevents unauthorized access or misuse is advantageously provided. Especially if the vehicle has been stolen, access to a vehicle component or to a plurality of vehicle components is able to be restricted or interrupted. This has the advantage that the theft of the vehicle is made more difficult or may even be prevented.

According to a an example embodiment, the vehicle is a fully automated or autonomous vehicle. According to a further specific embodiment, the vehicle is designed to travel in a parking lot autonomously from a drop-of location to a parking position in the parking lot and especially to park there, preferably to unpark again, and in particular to drive from the parking position back to the drop-off position or the drop-off point. Such a vehicle may specifically be referred to as an automatic valet parking (AVP) vehicle, i.e., a vehicle subject to an automatic parking operation.

Autonomous or fully automated or fully automatic within the meaning of the present invention specifically means that the vehicle navigates on its own, without an intervention on the part of the driver, especially in the parking lot. Thus, the vehicle drives in the parking lot by itself without a driver having to control the vehicle or without a driver having to be present in the vehicle to do so. This especially means that the vehicle includes a guidance device for the navigation of the vehicle in the parking lot according to a specific embodiment. The guidance device guides the vehicle autonomously. The guidance specifically encompasses a lateral and/or a longitudinal guidance of the vehicle.

In another specific embodiment, it is provided that the vehicle-external access include access to the vehicle component or to the plurality of vehicle components via the communications network. In other words, the access takes place via the communications network, in particular.

In another specific embodiment, the vehicle-external access includes access to a key system of the vehicle using a physical key. That is to say, using the physical key, for example, an attempt is made to start the vehicle or the vehicle is started up using the physical key. A key system especially includes a lock into which the physical key fits. For example, the lock is an ignition lock. The lock, for instance, is a vehicle lock.

According to a further specific embodiment, the request includes an override command for overriding the access wish by means of the physical key. The access using the physical key is thus advantageously able to be overridden. As a result, the physical key is advantageously no longer able to open a vehicle door or to start a drive system of the vehicle, for example. The access wish by means of the physical key is therefore ignored.

In another specific embodiment, the communications network includes a WLAN and/or a mobile telephony network.

This specifically means that the communication is able to be carried out via the WLAN and/or the mobile telephony network.

A drop-off position within the meaning of the present invention is a position at which a driver of the vehicle is able to leave the vehicle for an autonomous parking operation and from which he can pick up the vehicle again at a later point in time.

A parking position within the meaning of the present invention is a position at which the vehicle is meant to park autonomously.

In a specific embodiment, it is provided that the vehicle navigate autonomously from the drop-off position to the parking position.

In a further specific embodiment, the vehicle parks autonomously in the parking position.

In another specific embodiment, the vehicle unparks from the parking position autonomously.

According to still another specific embodiment, the vehicle navigates autonomously from the parking position to the drop-off position.

According to a still further specific embodiment, the vehicle transmits an information signal via the communications network to a user of the communications network to the effect that access to a vehicle component or to a plurality of vehicle components was requested and/or has already taken place and/or is still taking place. Preferably, the transmission is carried out as a function of one or more criteria. In other words, the information signal is preferably sent when the corresponding criteria are satisfied.

A criterion, for example, is a startup of the vehicle. This means, for example, that the information signal is sent to the user when the vehicle is started. The vehicle component that is accessed in this case is the drive system of the vehicle, in particular.

A criterion, for example, is an opening of one or more vehicle door(s). In other words, the information signal is preferably sent when one or more vehicle door(s) is/are opened or has/have been opened. The vehicle component that is accessed in this case is the door-locking system of the vehicle, in particular.

Further criteria similar to the opening of the vehicle doors, for instance, are an opening of a glove compartment (preferably after a vehicle door has been opened) and/or an opening of a trunk and/or an opening of a gas tank cap and/or an opening of an engine hood.

For example, one criterion is an operation of vehicle components such as a radio or a navigation system, preferably after a vehicle door has been opened.

The information signal in particular includes the information of the particular criterion that is involved, such as the information that the gas tank cap and/or the engine hood was/were opened.

This results in the particular technical advantage that the user of the communications network is informed of the fact that access to a vehicle component or to a plurality of vehicle components has been requested and/or has already taken place and/or is still taking place. The user of the communications network is a mobile telephone, for instance, especially a smartphone. The owner of the smartphone, e.g., a driver or owner of the vehicle, is thus advantageously able to take corresponding countermeasures in the event such an access is not desired or not authorized.

According to another specific embodiment, the communication via the communications network takes place in encrypted form. This results in the specific technical advantage that unauthorized parties are not readily able to participate in the reading of the data traffic.

According to another specific embodiment, it is provided that in response to the receipt of a control signal transmitted by a user of the communications network, the security device controls the vehicle component or the plurality of vehicle components in accordance with the control signal. This results in the particular technical advantage that a control of the vehicle component or of the plurality of vehicle components via the user of the communications network is possible. In other words, a driver or an owner of the vehicle is able to control a component or a plurality of components of the vehicle by means of his or her mobile telephone. Thus, a driver or an owner of the vehicle can advantageously override the vehicle-external access by a third party. This means, in particular, that both the vehicle-external access by a third party is restricted or interrupted, and that driver of the vehicle is advantageously able to initiate actions of his own such as halting the vehicle or bringing the vehicle to a standstill.

According to a specific embodiment, the vehicle component or the plurality of vehicle components is/are element(s) selected from among the following group of vehicle components: the steering system, brake system, drive system, lighting system (e.g., turn signal lamp ("blinker")), the warning hazard light system, locking system, belt system, and the driver-monitoring system.

According to a specific embodiment, the belt system is controlled in such a way that belts are pulled or tightened. As a consequence, a thief is advantageously able to be restrained or fixed to the seat by the tightened or pulled belts.

According to a specific embodiment, the driver-monitoring system will be activated, which particularly makes it possible to document the access.

According to a specific embodiment, the driver-monitoring system encompasses one or more video camera(s).

According to another specific embodiment, a clearance for a parking-lot administration server is set up for the access, and a clearance signal is transmitted to the parking-lot administration server via the communications network to the effect that the parking-lot administration server can access the vehicle component or the plurality of vehicle components via the communications network in accordance with the clearance.

This results in the specific technical advantage that a parking-lot administration server is able to access the vehicle component or the plurality of vehicle components. In other words, the parking-lot administration server is able to remotely control the vehicle within the scope of the clearance. For instance, the parking-lot administration server can turn the vehicle on or off, and/or can drive it to a parking position and/or drive it from the parking position back to a drop-off position. In particular, the parking-lot administration server is able to repark the car because of the remote-control option.

A parking-lot administration server within the meaning of the present invention is part of a parking-lot administration system, in particular. Such a parking-lot administration system, which is also referred to as a parking-lot management system, particularly coordinates an allocation of the parking positions, among other things. More specifically, such a parking-lot management system provides the AVP vehicles with the information necessary for executing the AVP operation, such as a digital map of the parking lot.

A parking lot within the sense of the present invention can also be referred to as a parking area and is used as a parking space for vehicles. Thus, the parking lot forms a contiguous area which encompasses a plurality of parking positions (in case of a parking lot on private property) or parking slots (in case of a parking lot on public property). According to a specific embodiment, the parking lot may be encompassed by an enclosed parking structure. In particular, the parking lot is, for example, encompassed by a garage.

According to another specific embodiment, the access and preferably at least some actions (and preferably, all actions) that are carried out in response to the access, are recorded. This results in the specific technical advantage that the kind of access that took place and the kind of actions that were carried out can be reconstructed even at a later point in time. This is advantageous for evidentiary purposes, in particular. A recording within the sense of the present invention thus involves especially a documentation of the access and especially of the actions.

According to another specific embodiment, the security device is designed to set up a clearance for a parking-lot administration server, and the communications interface is designed to transmit a clearance signal to the parking-lot administration server via the communications network to the effect that the parking-lot administration server can access the vehicle component or the plurality of vehicle components via the communications network in accordance with the clearance.

According to another specific embodiment, the vehicle includes the device according to the present invention.

Functionalities of the device and of the vehicle analogously result from the method, and vice versa.

In the following text the present invention will be described in greater detail on the basis of preferred exemplary embodiments.

DETAILED DESCRIPTION

Figure 1:
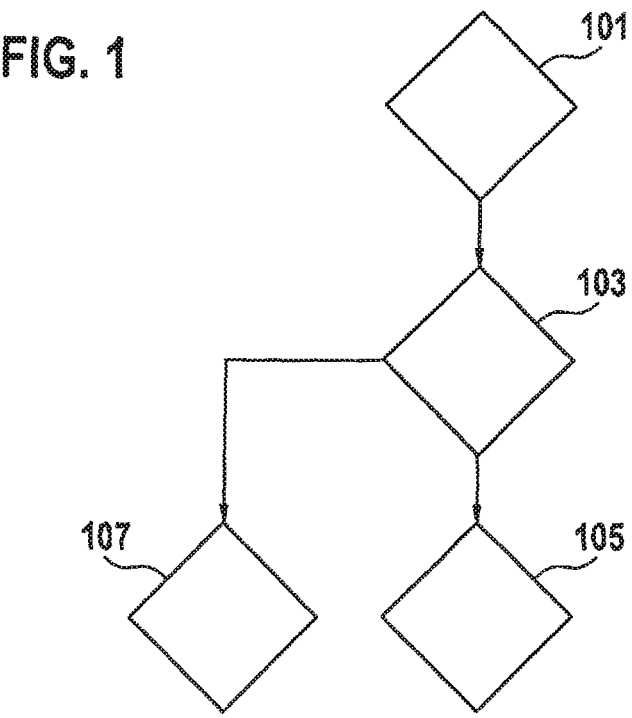
FIG. 1 is a flowchart that illustrates a method for operating a vehicle, according to an example embodiment of the present invention.

FIG. 1 is a flowchart that illustrates a method for operating a vehicle according to an example embodiment of the present invention. In a step 101, access to one or a plurality of vehicle component(s) is carried out, with this access involving a vehicle-external access. In other words, access to the vehicle takes place from the outside, in particular. In a step 103, it is checked whether the vehicle has received a request via a communications network to restrict or interrupt the access. If no request was received, according to a step 105 it is provided to permit the access. That is to say, the access will not be restricted or interrupted.

On the other hand, if the check in step 103 has revealed that a corresponding request was received via the communications network, then it is provided according to a step 107 that the vehicle-external access be restricted or interrupted.

The restriction or interruption of the vehicle-external access in particular involves the restricting of access to some of the vehicle components and the interrupting of a further access to other vehicle components.

Figure 2:
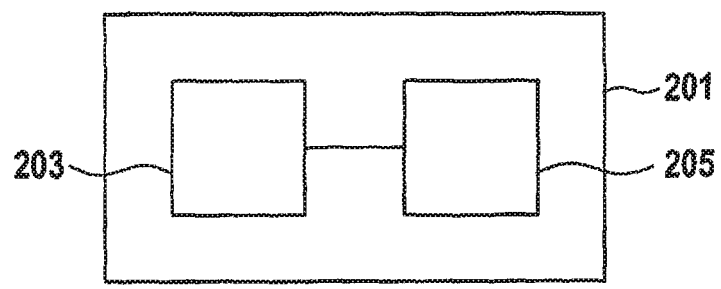
FIG. 2 illustrates a device for operating a vehicle, according to an example embodiment of the present invention.

FIG. 2 shows a device 201 for operating a vehicle.

Device 201 includes a communications interface 203, which is configured to receive a request for restricting or interrupting access to a vehicle component or to a plurality of vehicle components via a communications network. Device 201 includes a security device 205. If access to the vehicle component or to the plurality of vehicle components takes place and a corresponding request is received, security device 205 is designed to restrict or interrupt access to the vehicle component or to the plurality of vehicle components in accordance with the request.

Figure 3:
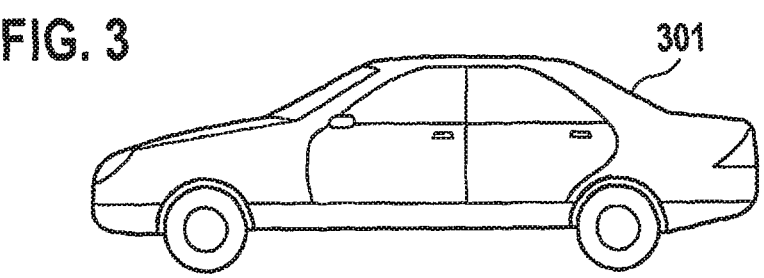
FIG. 3 illustrates a vehicle according to an example embodiment of the present invention.

FIG. 3 shows a vehicle 301, which is configured to execute the method of the present invention. Vehicle 301 includes device 201 from FIG. 2, for example.

Thus, the present invention is directed to a method, a device, a vehicle, and/or a computer program, which make it possible for the driver or the owner, for example, to interrupt an authorized online access to the vehicle (access via a communications network) by a parking lot management system that includes a parking-lot administration server, at any time. Such an authorized access is granted to the parking-lot administration server according to a specific embodiment, or will be transmitted to the parking-lot administration server according to a specific embodiment.

According to another specific embodiment, the driver or owner assumes the control or guidance of the vehicle after the access has been restricted or interrupted. This is accomplished especially in that the user of the communications network transmits control signals via the communications network to the vehicle, i.e., to the security device, as already outlined earlier.

According to another specific embodiment, all authorized accesses as well as their consequences are recorded, or in other words, are documented, in particular.

Example embodiments of the present invention involve what is known as a "main key/main account," which owns or holds what is known as "ADMIN rights," which thus allow for a deactivation or restriction of granted accesses at any time. In other words, a higher-level instance, in this case especially an administrator account, is provided, which is able to deactivate the granted accesses at any time, i.e., prevent or terminate or interrupt or restrict the accesses. "ADMIN" is shorthand for administrator. This means that the driver or owner is the administrator and is able to restrict accesses to the driver's vehicle. In other words, the security device, in particular, includes such an administrator account, which restricts and/or prevents and/or interrupts and/or overrides the accesses to the vehicle components or to the vehicle systems. The security device thus encompasses an ADMIN functionality, in particular.

According to an example embodiment, the following features are provided, either individually or in any combination: the vehicle is left in the drop-off zone (drop-off point); the parking-lot management system is granted online access (clearance) to the vehicle (temporarily or permanently; during the drop-off or also in advance); the driver/owner is able to monitor/control the access/entry at all times, and it is furthermore possible that the driver will be informed if certain criteria are present (e.g., a start of the vehicle prior to a specific time); if the driver/owner does not agree to an access, then the driver/owner is able to deactivate/restrict the authorized access; as an option, preferably the driver is able to initiate, on the driver's own, actions, such as a stop of the vehicle; and, furthermore, all accesses and actions are preferably documented for evidentiary purposes, for instance.

In general, the present method can preferably also be used for "normal" valet parking (by human staff).

In addition, according to another specific embodiment, an access by a real, physical key (as currently used in vehicles) is likewise able to be overridden by the online ADMIN method.

What is claimed is:

1. A method comprising:
based on a request received by a vehicle via a communications network, restricting or interrupting, by a vehicle-internal security device of the vehicle, an attempt, by a vehicle-external component, to access one or more vehicle components of the vehicle,
wherein:
the attempted access is via the communications network;
a clearance for a parking-lot administration server is set up for the access;
a clearance signal is transmitted via the communications network to the parking-lot administration server via the communications network indicating that the one or more vehicle components are accessible by the parking-lot administration server in accordance with the clearance.

2. The method of claim 1, wherein the attempted access is via the communications network.

3. The method of claim 1, wherein the attempted access includes an attempted access to a key system of the vehicle using a physical key.

4. The method of claim 3, wherein the request includes an override command for overriding the attempted access.

5. The method of claim 1, wherein the vehicle transmits an information signal via the communications network to a user of the communications network indicating the attempt to access, that the access was carried out, or that the access is being carried out.

6. The method of claim 1, further comprising:
responsive to receipt of a control signal transmitted by a user of the communications network, the security device controlling the one or more vehicle components in accordance with the control signal.

7. The method of claim 1, further comprising recording the attempted access.

8. The method of claim 1, further comprising recording an action carried out in response to the access.

9. A device comprising:
a communications interface configured to receive, via a communications network, a request for restricting or interrupting access to one or more vehicle components; and
a security device configured to, based on the request, restrict or interrupt an attempt to access one or more vehicle components of the vehicle,
wherein the security device is configured to set up a clearance for a parking-lot administration server, and the communications interface is configured to transmit, via the communications network and to the parking-lot administration server, a clearance signal indicating that the one or more vehicle components are accessible by the parking-lot administration server via the communications network in accordance with the clearance.

10. A vehicle comprising a device that includes:
a communications interface configured to receive, via a communications network, a request for restricting or interrupting access to one or more vehicle components; and
a security device configured to, based on the request, restrict or interrupt an attempt to access one or more vehicle components of the vehicle,
wherein the security device is configured to set up a clearance for a parking-lot administration server, and the communications interface is configured to transmit, via the communications network and to the parking-lot administration server, a clearance signal indicating that the one or more vehicle components are accessible by the parking-lot administration server via the communications network in accordance with the clearance.

11. A non-transitory computer-readable medium on which are stored instructions that are executable by a processor of a vehicle-internal security device of a vehicle and that, when executed by the processor, cause the processor to perform a method, the method comprising:
based on a request received via a communications network, restricting or interrupting an attempt, by a vehicle-external component, to access one or more vehicle components of the vehicle,
wherein the security device is configured to set up a clearance for a parking-lot administration server, and the communications interface is configured to transmit to the parking-lot administration server, a clearance signal indicating that the one or more vehicle components are accessible by the parking-lot administration server via the communications network in accordance with the clearance.

* * * * *